(12) United States Patent
Yang et al.

(10) Patent No.: US 11,974,525 B2
(45) Date of Patent: May 7, 2024

(54) AQUATIC PLANT GROWING MATERIAL

(71) Applicant: Penn-Plax, Inc., Hauppauge, NY (US)

(72) Inventors: Wenan Yang, Guangdong (CN); Jiangyan Zhao, Guangdong (CN)

(73) Assignee: Penn-Plax, Inc., Hauppauge, NY (US)

( * ) Notice: Subject to any disclaimer, the term of this patent is extended or adjusted under 35 U.S.C. 154(b) by 242 days.

(21) Appl. No.: 17/358,778

(22) Filed: Jun. 25, 2021

(65) Prior Publication Data

US 2022/0000047 A1 Jan. 6, 2022

Related U.S. Application Data

(60) Provisional application No. 63/047,474, filed on Jul. 2, 2020.

(51) Int. Cl.
*A01G 24/30* (2018.01)
*A01G 24/40* (2018.01)
*A01G 24/60* (2018.01)
*A01G 31/00* (2018.01)
*A01K 63/00* (2017.01)
*C09D 163/00* (2006.01)

(52) U.S. Cl.
CPC .............. *A01G 24/30* (2018.02); *A01G 24/40* (2018.02); *A01G 24/60* (2018.02); *A01G 31/00* (2013.01); *A01K 63/006* (2013.01); *C09D 163/00* (2013.01)

(58) Field of Classification Search
CPC . A01G 31/00; A01G 9/02; A01G 5/06; A01G 24/10; A01G 24/44; A01C 1/04; A01K 63/006; A01K 61/10; A01K 61/00; A01K 63/00; A01K 63/003; B44C 5/06; B05C 19/001; B05C 19/002
USPC .......................... 119/246, 253; 156/61; 47/61
See application file for complete search history.

(56) References Cited

U.S. PATENT DOCUMENTS

| 2,826,865 A | * | 3/1958 | Chohamin | ............. | A01C 1/044 47/56 |
| 2015/0359181 A1 | * | 12/2015 | Yuristy | .................. | A01G 20/20 47/59 R |

FOREIGN PATENT DOCUMENTS

CA         2172893 A1 * 10/1996   ............. A01G 24/27

OTHER PUBLICATIONS

Rwayne, Why Are Aquarium Decorations So Abrasive??, May 11, 2017 (Year: 2017) https://www.fishlore.com/aquariumfishforum/threads/why-are-aquarium-decorations-so-abrasive.280628/.*
Fishlore, Why Are Aquarium Decorations So Abrasive??, May 11, 2017 (Year: 2017) https://www.fishlore.com/aquariumfishforum/threads/why-are-aquarium-decorations-so-abrasive.280628/.*

* cited by examiner

*Primary Examiner* — Joshua J Michener
*Assistant Examiner* — Nicole Paige MacCrate
(74) *Attorney, Agent, or Firm* — The Farrell Law Firm, P.C.

(57) ABSTRACT

The present application is directed to a method of applying a plant growing material to a surface of a mold décor, the method comprising flocking at least one aquatic seed to the surface of a mold décor to adhere the at least one aquatic seed to the surface of the mold décor.

7 Claims, 6 Drawing Sheets

AQUATIC PLANT GROWING MATERIAL

PRIORITY

This application is based on and claims priority under 35 U.S.C. § 119(e) to U.S. Provisional Patent Application Ser. No. 63/047,474, which was filed in the U.S. Patent and Trademark Office on Jul. 2, 2020, the entire content of which is incorporated herein by reference.

BACKGROUND

1. Field of the Disclosure

The present disclosure relates generally to aquatic plants in aquariums.

2. Description of Related Art

Aquariums commonly feature aquatic plants which enhance the beauty of an aquarium and provide a natural looking landscape. Aquatic plants may be partially or fully submerged in water and may be live or artificial.

Artificial aquatic plants are commonly used in aquariums because they are easier to manage than live aquatic plants. For example, artificial aquatic plants do not require close monitoring to ensure that they are healthy, growing normally, and not disturbing an aquarium's ecosystem.

Nevertheless, aquarium users often prefer live aquatic plants because they absorb carbon dioxide and toxins, produce oxygen, and provide a source of food to other aquatic organisms. In addition, live aquatic plants are organisms which grow and adapt and are therefore more pleasing to many individuals.

Aquarium keepers, however, have found it difficult to maintain live aquatic plants because, unlike artificial aquatic plants, they require maintenance to be cared for. Thus, a low-maintenance live aquatic plant is highly desirable.

SUMMARY

The present disclosure has been made to address at least the above-mentioned problems and/or disadvantages and to provide an apparatus and method to produce a low-maintenance aquatic plant.

According to an aspect of the present disclosure, a method of applying a plant growing material to a surface of a mold décor is provided. The method includes flocking aquatic seeds to the surface of a mold décor to adhere the seeds to the surface of the mold décor.

According to another aspect of the present disclosure, a mold décor is provided. The mold décor includes at least one surface with aquatic seeds flocked to the surface of the mold décor to adhere the aquatic seeds to the surface of the mold décor.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION

The following description with reference to the accompanying drawings is provided to assist in a comprehensive understanding of embodiments of the present disclosure as defined by the claims and their equivalents. It includes specific details to assist in the understanding, but those of ordinary skill in the art will recognize that various changes and modifications of the embodiments described herein may be made without departing from the scope and spirit of the present disclosure. In addition, descriptions of well-known functions and constructions may be omitted for clarity and conciseness.

The terms and words used in the following description and claims are not limited to their dictionary meanings, but, are merely used to enable a clear and consistent understanding of the present disclosure. Accordingly, it should be apparent to those skilled in the art that the following description of embodiments of the present disclosure is provided for illustration purposes only and not for the purpose of limiting the present disclosure.

The present disclosure provides a method for growing aquatic plants, and an apparatus thereof, which is an improvement over conventional aquatic plants because it provides a plant growing material for easily growing aquatic plants, requiring reduced maintenance and upkeep from a caretaker.

Figure 1:
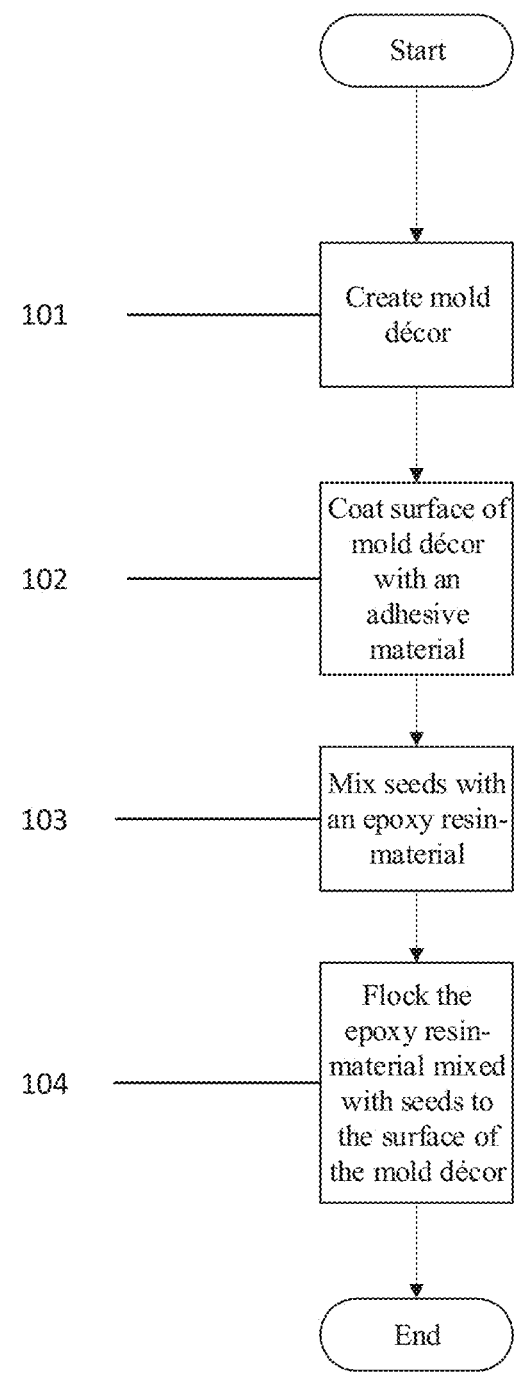
FIG. 1 illustrates a method of applying a plant growing material to a surface of a mold décor to create an aquatic plant, according to an embodiment.

FIG. 1 illustrates a method of applying a plant growing material to a surface of a mold décor to create an aquatic plant, according to an embodiment.

It is noted that the term "mold décor" may refer to any artificial material that is used to, in this case, decorate an aquarium. For example, a mold décor can refer to a rock-based material, a plastic-based material, or a metal-based material.

Referring to FIG. 1, in step 101, a mold décor is created. For example, the mold décor may be created by pouring resin into a mold to harden, thus forming the mold décor. Once fully dried, the mold décor may be sanded to remove sharp and/or extra edges, and to shape the mold décor. After a desired shape is achieved, then the mold décor may be painted.

In step 102, certain regions of the mold décor may optionally be coated with an adhesive material (e.g., an epoxy resin-material) to help improve adhesive properties of the surface of the mold décor. Next, using a flocking machine, some of the sides or edges of the mold décor may be flocked with an artificial moss to produce aesthetically pleasing features of the mold décor to which seeds may be attached. In step 103, an epoxy resin-material is mixed into the flocking machine with seeds to be attached to the surface of the décor Before being attached, the seeds may optionally be sprayed with nutrients to improve their aquatic growing characteristics.

The seeds may be placed into a flocking machine and, in step 104, the seeds mixed with the epoxy resin-material are flocked onto the surfaces or edges of the mold décor. For example, the seeds mixed with the epoxy resin-material may be flocked onto mossy areas (i.e., mossy areas having a particular color such as green) on the surfaces or edges of the mold décor. The seeds may stay (i.e., held down) in place by the tomentum of the mossy areas. That is, even if the seeds are not sticky and do not otherwise have a means of being attached to the mold décor, the seeds may be flocked onto the mossy areas that are attached to the surfaces or edges of the mold décor.

It is noted that the method shown in FIG. 1 is for illustrative purposes, and it may be possible to perform additional steps or to omit some of the steps shown in FIG. 1 to apply the plant growing material to a surface.

Additionally or alternatively, the seeds may attach to materials other than mossy areas. For example, the seeds may be flocked onto foam, sponge-type materials, natural or artificial wood, ceramic materials, batting and/or floss-type materials, cloth, or any suitable material capable of holding the seeds in place. The wide variety of materials which the seeds may be attached to is a highly beneficial quality, as many different designs of artificial aquatic plants are possible.

More specifically, any material in which the seeds may attach to a surface thereof may be used. In this regard, the beneficial characteristics of the material for attachment of the seeds include but are not limited to crevices, cavities, and irregularities in the materials' surface to promote embedding of the seeds to the surface of the material. For example, after flocking, the seeds may be attached to uneven surfaces or edges of the mold décor.

After the seeds are flocked to the surface of the mold décor (i.e., a mossy area, a location having epoxy resin, and/or another material's surface), the mold décor should be placed in a dry and cool location to fully dry. It may take about 78 hours to dry completely.

Once the aquatic plant including the mold décor flocked with the seeds has dried, a user (e.g., an aquarium user) may place the plant underwater such that the surface flocked with the seeds is at least partially submerged in water, and the seeds may sprout and plants may grow from the surface flocked with the seeds.

Although the only requirement for the seeds to sprout and grow into plants is for the resin area to be submerged in water, other conditions may be beneficial for growth, such as a water temperature between 70-80 degrees Fahrenheit, properly filtered and aerated water, a water pH between 4.0-8.0, a supplemental carbon dioxide supply in the water, and/or a plant growing light emitting diode (LED) light to assist in growth.

Under normal conditions, the seeds may begin sprouting 4 days after being submerged in water and continue growing indefinitely. The aquatic plant may be fully grown about 20 days after being submerged in the water.

While any type of aquatic seeds can be used, seed types that produce low growing plants (i.e., plants that appear to grow horizontally with only a small vertical component to their growth) may be preferred, such as those of the *Glossostigma* genus or the Lemnoideae (duckweed) genera (i.e., *Spirodela, Landoltia, Lemna, Wolffiella*, and/or *Wolffia*). Additionally, other aquatic seed types may be used.

In addition, after the seeds sprout and begin growing, other organisms in the aquarium may be attracted to and/or consume the plants that sprouted from the seeds. The plants may not be able to grow and/or bloom if they are being consumed by other organisms. Thus, in order to maximize growth of the aquatic plant, the user may want to ensure that other organisms present in the aquarium do not consume the plants.

On the other hand, the aquatic plant may be healthy and nutritious for certain organisms to consume. Therefore, a user may prefer for fish, or other organisms, to consume the plant. In this case, the user may allow fish to eat the aquatic plants, thereby using the plants as a consumable rather than a décor.

Figure 2:
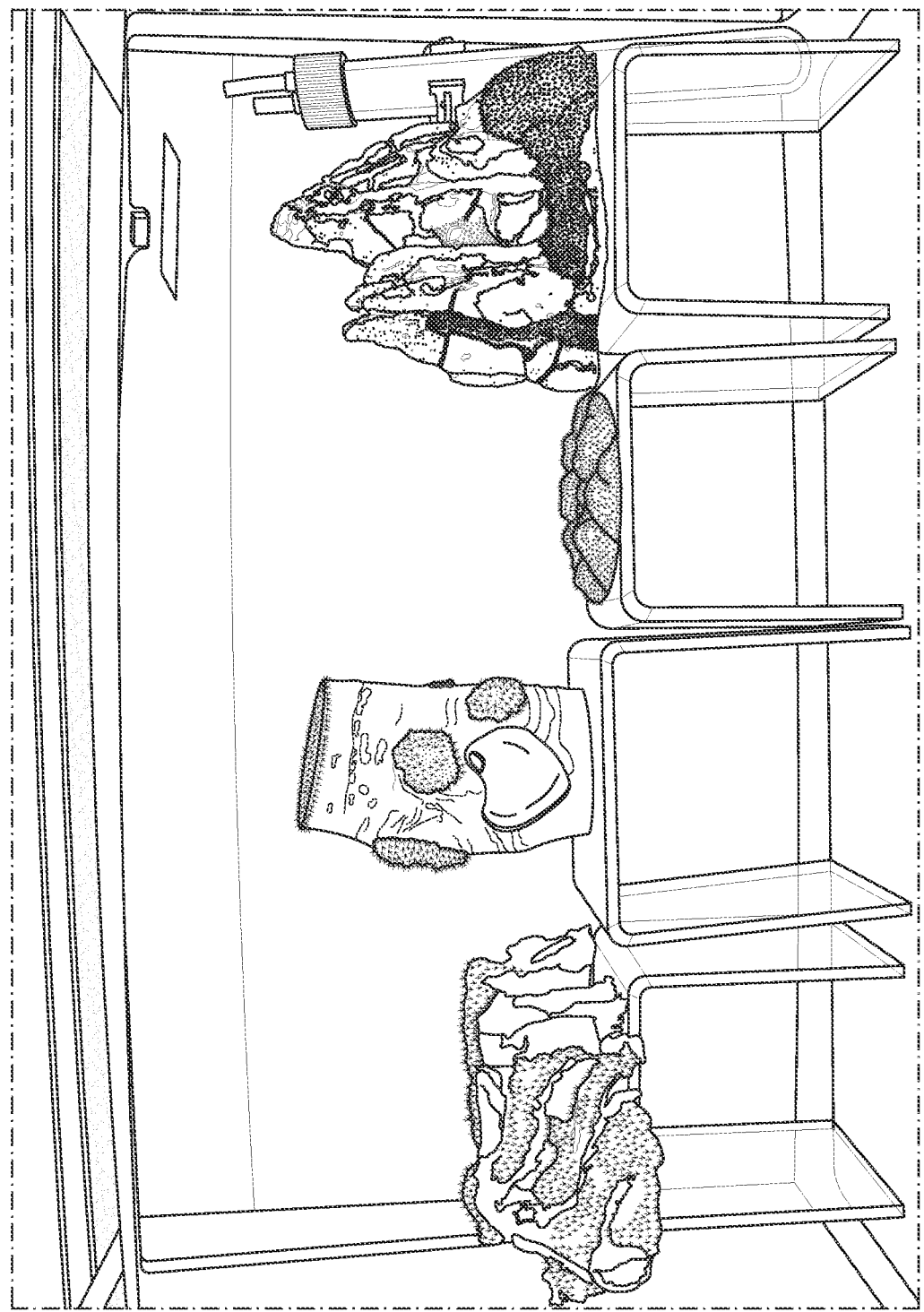
FIG. 2 illustrates a variety of aquatic plants with a plant growing material attached to at least one surface thereof, according to an embodiment.

FIG. 2 illustrates a variety of aquatic plants with a plant growing material attached to at least one surface thereof, according to an embodiment.

As illustrated in FIG. 2, mossy area(s) with the seeds may be flacked to different types of surfaces and/or edges of aquatic plants. Thus, many different types of aquatic plants can be grown with seeds embedded into an aquatic plant growing material, as described in the present disclosure.

Figure 3:
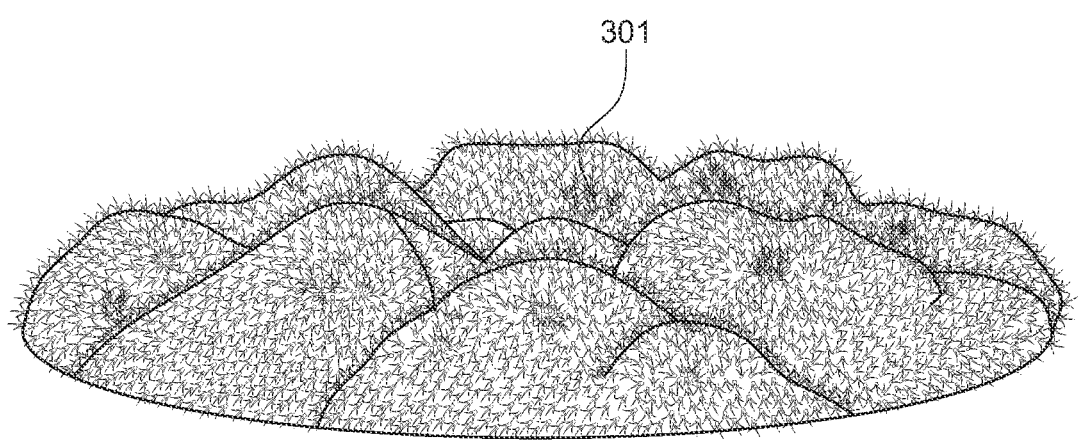
FIG. 3 illustrates a disc-shaped aquatic plant with a plant growing material attached to a surface thereof, according to an embodiment.

FIG. 3 illustrates a disc-shaped aquatic plant with a plant growing material attached to a surface thereof, according to an embodiment.

As illustrated in FIG. 3, the aquatic plant growing material 301 may be attached to a disc-shaped surface. Although the thickness of the disc-shaped surface is relatively thin, the aquatic plant growing material 301 may be attached to the surface and allow for the seeds to sprout and grow.

Figure 4:
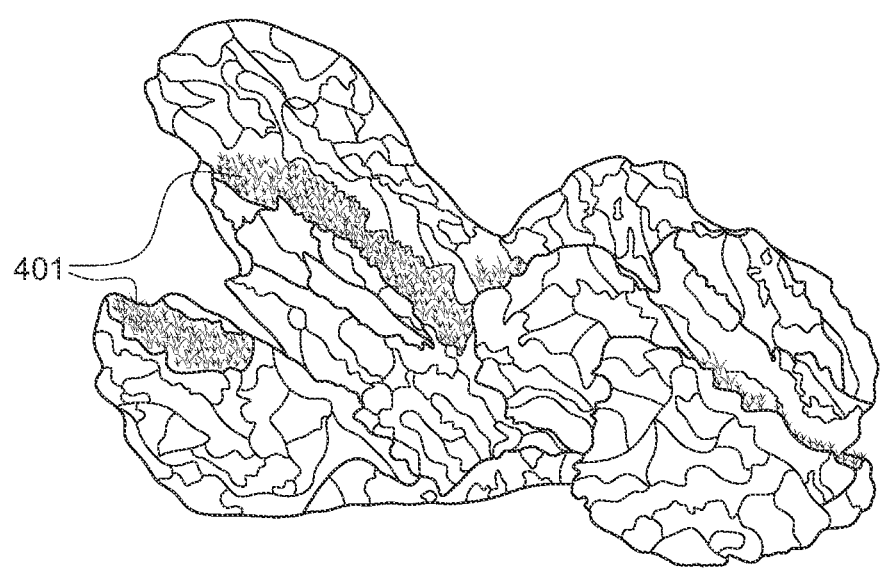
FIG. 4 illustrates a rock-type aquatic plant with a plant growing material attached to at least one surface thereof, according to an embodiment.

FIG. 4 illustrates a rock-type aquatic plant with a plant growing material attached to at least one surface thereof, according to an embodiment.

As illustrated in FIG. 4, the aquatic plant that is shown has many different surfaces with various shapes or edges. The aquatic plant growing material 401 may be attached to areas that are rough, jagged, and/or uneven. Despite the atypical surfaces or edges which the aquatic plant growing material 401 is attached to, the seeds embedded in the aquatic plant growing material 401 may still sprout and grow into plants.

Figure 5:
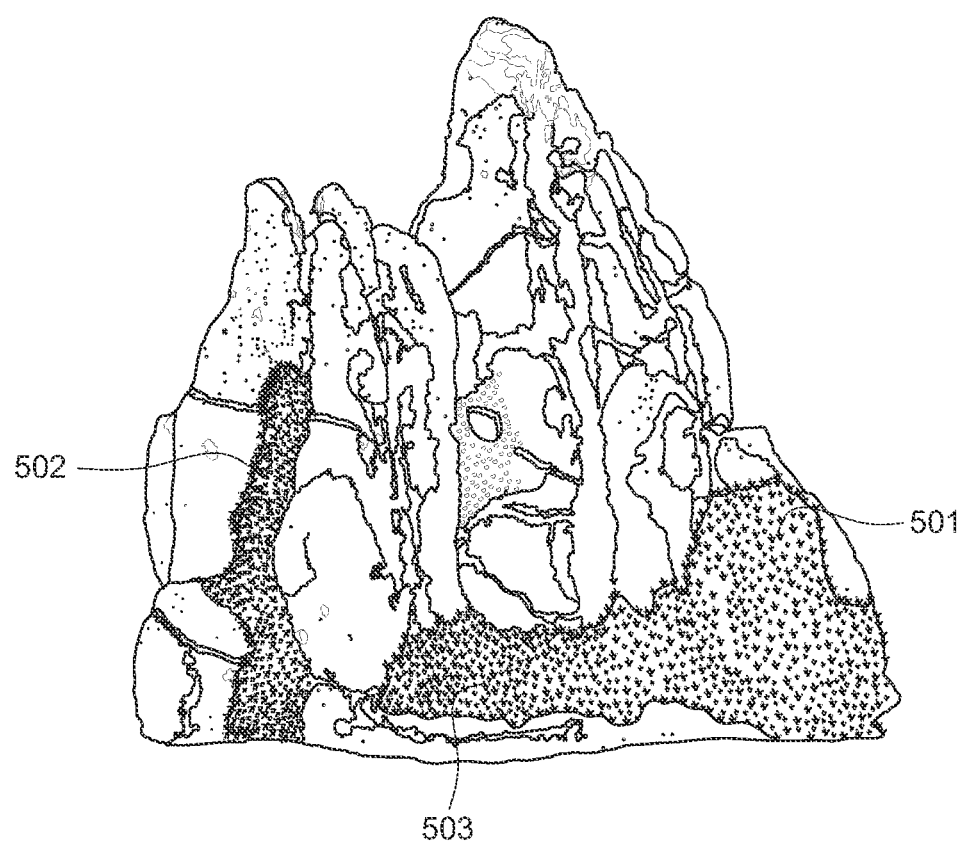
FIG. 5 illustrates a rock-type aquatic plant with a plant growing material attached to at least one surface thereof, according to an embodiment.

FIG. 5 illustrates a rock-type aquatic plant with a plant growing material attached to at least one surface thereof, according to an embodiment.

As illustrated in FIG. 5, a rock-type aquatic plant is shown where the aquatic plant growing material 501 is attached to atypical vertical areas 502 and horizontal areas 503 featuring surfaces with crevices of various lengths and/or shapes.

Figure 6:
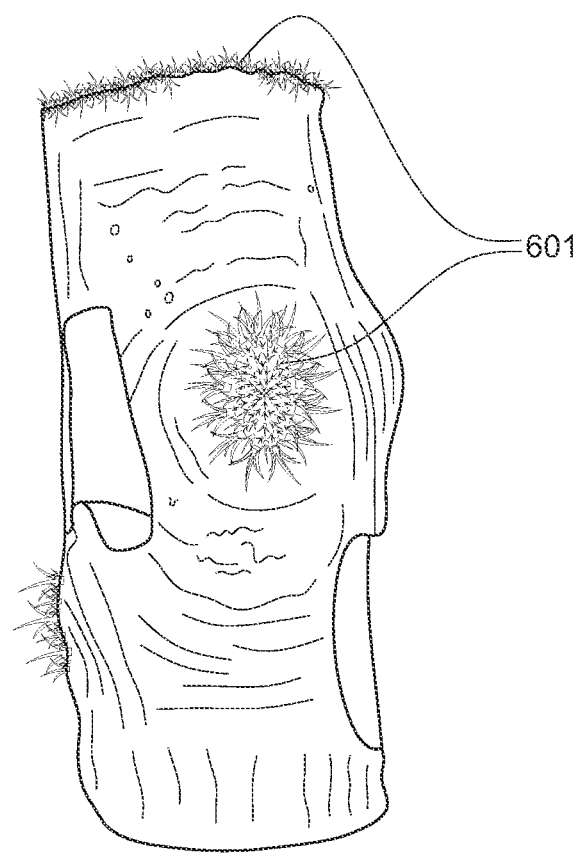
FIG. 6 illustrates a tree-type aquatic plant with a plant growing material attached to at least one surface thereof, according to an embodiment.

FIG. 6 illustrates a tree-type aquatic plant with a plant growing material attached to at least one surface thereof, according to an embodiment.

As illustrated in FIG. 6, the aquatic plant can be made to resemble wood. Furthermore, the plant growing material 601 can be attached to particular areas of the mold décor so that the aquatic plant appears life-like.

While the present disclosure has been shown and described with reference to certain embodiments thereof, it will be apparent to those skilled in the art that the present disclosure is not limited to these embodiments, and various changes in form and details may be made therein without departing from the spirit and scope of the present disclosure as defined by the appended claims and their equivalents.

What is claimed is:

1. A method of applying a plant growing material to a surface of a mold décor, the method comprising:
   coating the surface of the mold décor with an adhesive material;

mixing at least one aquatic seed with an epoxy resin-material;

placing the epoxy resin-material mixed with the at least one aquatic seed into a flocking machine;

flocking the epoxy resin-material mixed with the at least one aquatic seed to the surface of the mold décor with the flocking machine to adhere the at least one aquatic seed to the surface of the mold décor; and submerging the mold décor underwater, wherein the at least one aquatic seed that is flocked to the epoxy resin-material begins to grow after submerging the mold décor underwater.

2. The method of claim 1, further comprising creating the mold décor by pouring resin into a mold to harden and sanding the mold décor to remove sharp edges and achieve a desired shape.

3. The method of claim 1, wherein the surface of the mold décor that the at least one aquatic seed is adhered to is an uneven surface.

4. The method of claim 1, wherein the surface of the mold décor that the at least one aquatic seed is adhered to includes at least one horizontal surface and at least one vertical surface.

5. The method of claim 1, wherein the surface of the mold décor that the at least one aquatic seed is adhered to includes a rock-type surface including at least one cavity.

6. The method of claim 1, wherein the surface of the mold décor that the at least one aquatic seed is adhered to includes an artificial mossy area, and wherein the at least one aquatic seed is adhered to the surface of the mold décor by, at least, a tomentum of the artificial mossy area.

7. The method of claim 6, wherein the at least one aquatic seed that is adhered to the surface of the mold décor including the artificial mossy area begins to grow after the mold décor has been submerged underwater, thereby causing a natural plant to grow on top of the artificial mossy area.

* * * * *